(12) United States Patent
Schuchter et al.

(10) Patent No.: US 11,582,958 B2
(45) Date of Patent: Feb. 21, 2023

(54) SYSTEMS AND METHODS FOR UNDERWATER LIGHTING

(71) Applicant: Dome Cast Systems LLC, Highland Heights, KY (US)

(72) Inventors: Jeffrey Thomas Schuchter, Highland Heights, KY (US); Benjamin Thomas Krupp, Wyoming, OH (US)

(73) Assignee: Dome Cast Systems LLC, Highland Heights, KY (US)

( * ) Notice: Subject to any disclaimer, the term of this patent is extended or adjusted under 35 U.S.C. 154(b) by 0 days.

(21) Appl. No.: 17/174,251

(22) Filed: Feb. 11, 2021

(65) Prior Publication Data

US 2021/0244007 A1   Aug. 12, 2021

Related U.S. Application Data

(60) Provisional application No. 62/972,854, filed on Feb. 11, 2020.

(51) Int. Cl.
| | |
|---|---|
| *A01K 75/02* | (2006.01) |
| *F21V 31/00* | (2006.01) |
| *F21S 9/02* | (2006.01) |
| *H05B 47/19* | (2020.01) |
| *F21V 15/00* | (2015.01) |
| *F21V 33/00* | (2006.01) |
| *H05B 47/105* | (2020.01) |
| *H02J 50/10* | (2016.01) |
| *F21Y 115/10* | (2016.01) |

(52) U.S. Cl.
CPC .............. *A01K 75/02* (2013.01); *F21S 9/02* (2013.01); *F21V 15/005* (2013.01); *F21V 31/005* (2013.01); *F21V 33/008* (2013.01); *H05B 47/105* (2020.01); *H05B 47/19* (2020.01); *F21Y 2115/10* (2016.08); *H02J 50/10* (2016.02)

(58) Field of Classification Search
CPC ........ A01K 85/01; A01K 75/02; F21V 31/005
See application file for complete search history.

(56) References Cited

U.S. PATENT DOCUMENTS

| | | |
|---|---|---|
| 867,256 A | 10/1907 | Dion |
| 3,502,861 A | 3/1970 | Evans |
| 3,949,213 A | 4/1976 | Paitchell |

(Continued)

OTHER PUBLICATIONS

Attwood Corporation, Marine Products Catalog, Lighting (2019), retrieved on Jun. 18, 2021 from: http://old.attwoodmarine.com/userfiles/image/Catalog/a2e63411-2019_Att_Ctlg-aug2018-hires.pdf; 39 pages.

(Continued)

*Primary Examiner* — William N Harris
(74) *Attorney, Agent, or Firm* — Ulmer & Berne LLP; Vance V. Van Drake, III

(57) ABSTRACT

An underwater lighting system includes a light housing. The light housing includes a weighted base having a bottom surface with a bottom edge and a cover. The cover and the weighted base cooperate to define a cover interior. The cover interior is waterproof. The light housing also includes a light source positioned within the cover interior. The underwater lighting system is configured to prevent a fishing lure or cast net from snagging on the underwater lighting system.

20 Claims, 16 Drawing Sheets

(56) References Cited

U.S. PATENT DOCUMENTS

| | | | |
|---|---|---|---|
| 4,394,716 A * | 7/1983 | Campagna | F21S 8/00 |
| | | | 362/158 |
| 4,765,711 A | 8/1988 | Obst | |
| 5,651,209 A | 7/1997 | Rainey | |
| 6,247,827 B1 | 6/2001 | Carter | |
| 6,315,429 B1 | 11/2001 | Grandolfo | |
| 7,008,081 B2 | 3/2006 | Lunt | |
| 7,125,146 B2 | 10/2006 | Willis et al. | |
| 7,591,564 B1 | 9/2009 | Ball et al. | |
| 7,607,253 B2 | 10/2009 | Makowski | |
| 7,762,685 B1 | 7/2010 | Beucler | |
| 8,123,372 B1 * | 2/2012 | Ball | F21S 8/00 |
| | | | 362/101 |
| 9,109,766 B1 | 8/2015 | Ball et al. | |
| 10,077,896 B2 * | 9/2018 | Butcher | B63B 45/02 |
| 2002/0178641 A1 | 12/2002 | Kent | |
| 2006/0176686 A1 | 8/2006 | Mcvicker | |
| 2010/0002435 A1 * | 1/2010 | Rash | F21V 31/005 |
| | | | 362/235 |
| 2017/0122536 A1 | 5/2017 | Noga | |

OTHER PUBLICATIONS

International Search Report and Written Opinion of the International Searching Authority for International Patent App. No. PCT/US21/17717 dated Apr. 21, 2021; 9 pages.

SeaFloor Lights, Installation Tips for the Model SF 60 and SF 100, "Bottom Up Dock Lighting", retrieved on Jun. 18, 2021 from: http://www.seafloorlights.com/installing-sf60-sf100/; 2 pages.

* cited by examiner

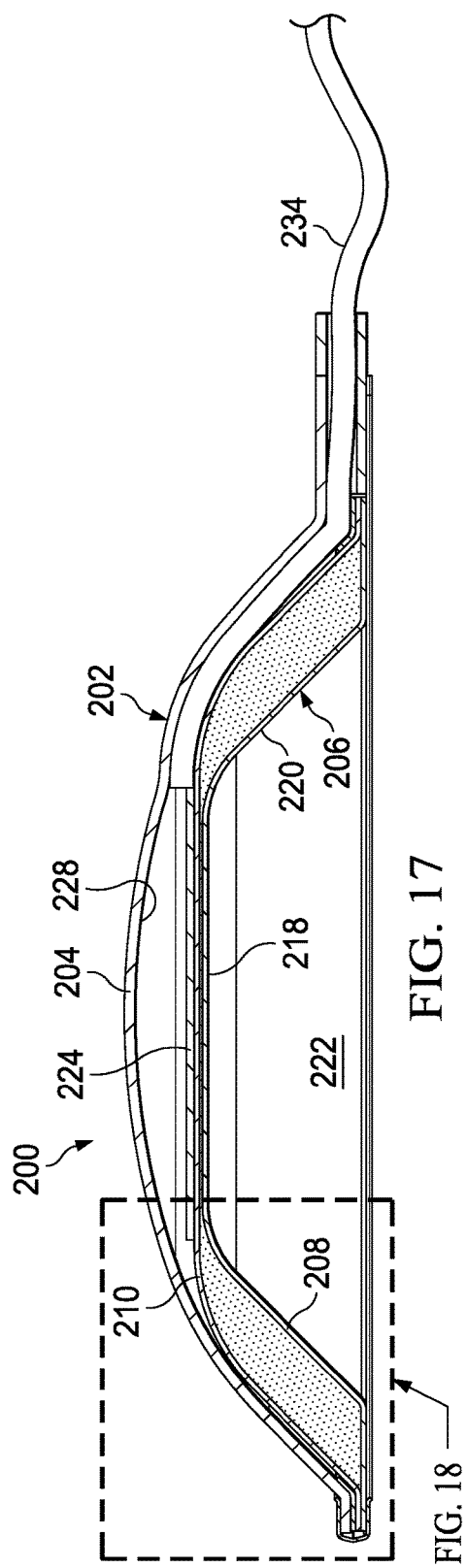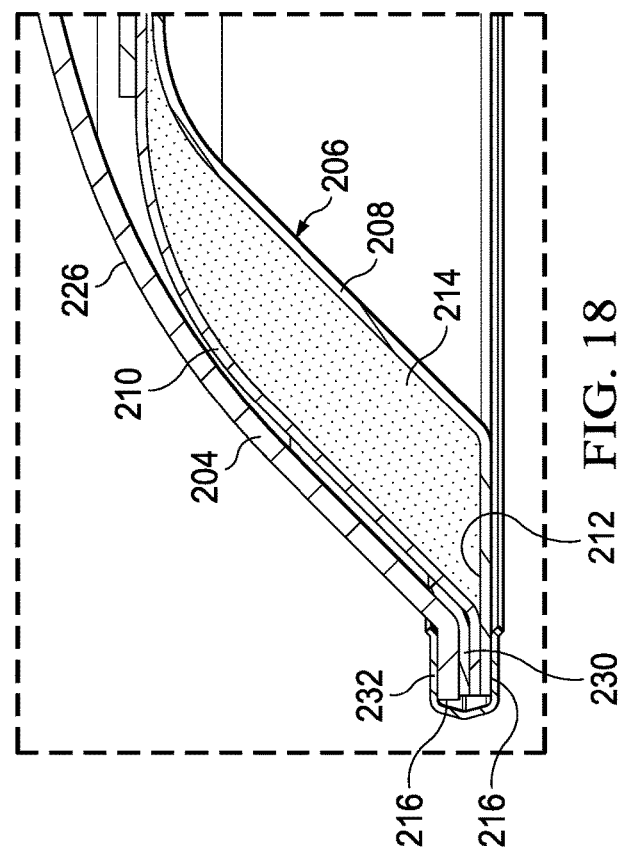

SYSTEMS AND METHODS FOR UNDERWATER LIGHTING

CROSS REFERENCE TO RELATED APPLICATIONS

This application claims the priority benefit of U.S. Provisional Patent Application No. 62/972,854, filed Feb. 11, 2020, which is hereby incorporated herein by reference in its entirety.

TECHNICAL FIELD

Embodiments of the technology relate, in general, to underwater lighting technology, and in particular to systems and methods for underwater lighting and retrofitting an underwater light.

BACKGROUND

Often, underwater light systems get caught in a cast net or snag a fishing line. There is a need for improved underwater light systems.

SUMMARY

In an embodiment, an underwater lighting system is provided. The underwater lighting system may include a light housing. The light housing may include a weighted base having a bottom surface with a bottom edge and a cover. The cover and the weighted base may cooperate to define a cover interior. The cover interior is waterproof. The light housing may also include a light source positioned within the cover interior. The underwater lighting system may be configured to prevent a fishing lure or cast net from snagging on the underwater lighting system.

BRIEF DESCRIPTION OF THE DRAWINGS

The present disclosure will be more readily understood from a detailed description of some example embodiments taken in conjunction with the following figures:

FIG. 17 is an elevation view of the underwater lighting system of FIG. 16.

FIG. 18 is an expanded view of a portion of the underwater lighting system of FIG. 17.

DETAILED DESCRIPTION

Figure 1:
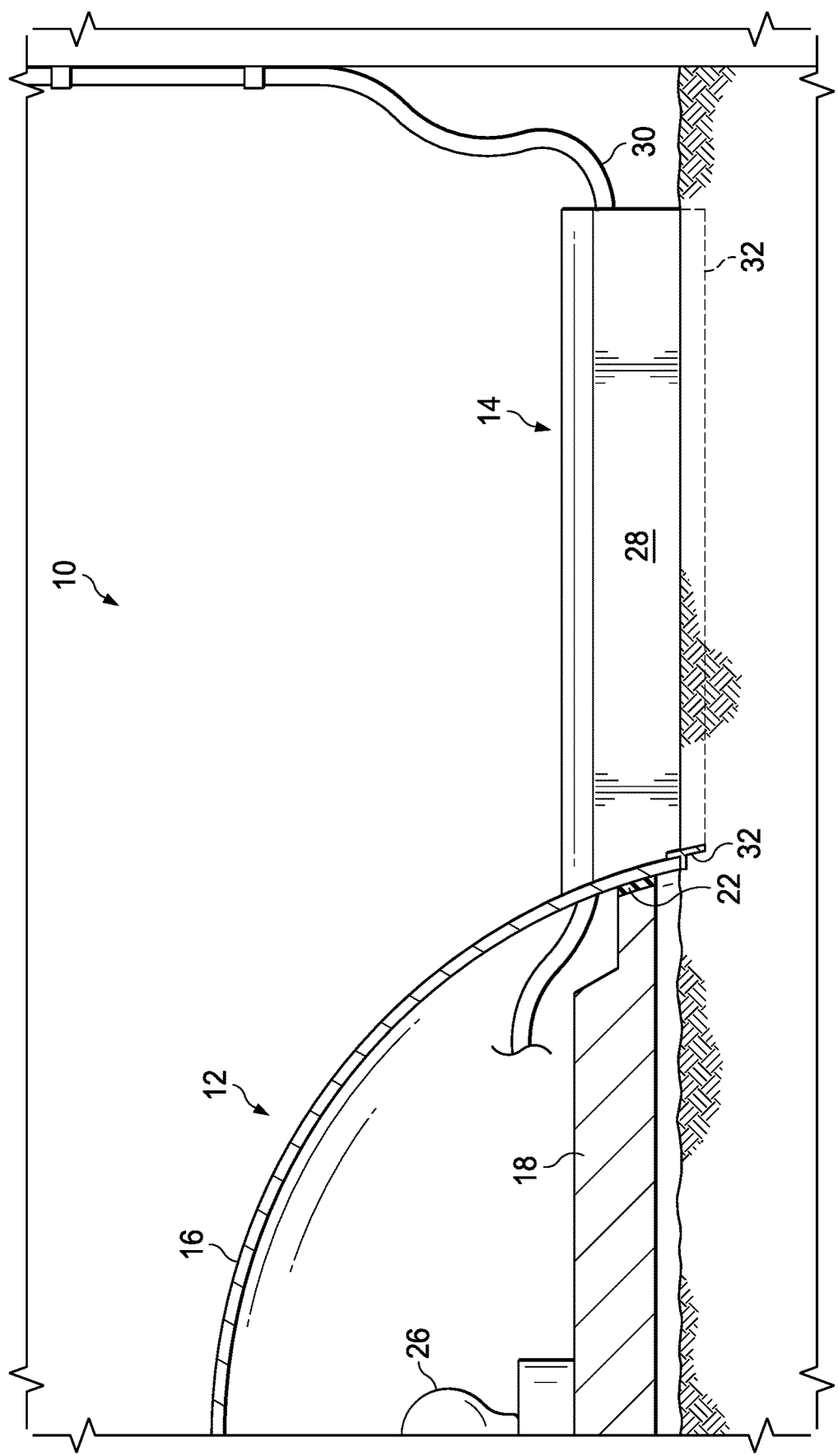
FIG. 1 is an elevation view of an underwater lighting system including a light housing and a power supply protector according to an embodiment.

Various non-limiting embodiments of the present disclosure will now be described to provide an overall understanding of the principles of the structure, function, and use of the systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Described herein are example embodiments of systems and methods for underwater lighting. Underwater lighting devices used by fishermen or boaters are used for attracting fish for the purpose of being caught. Underwater lights attract zooplankton, which attracts baitfish, such as shad, herring, mullets, sardines, and pinfish, which in turn attracts predator fish, such as snook. In one example embodiment, an underwater lighting system comprises a bottom-dwelling unit including a light housing with a heavily weighted base that fits on the underside of the housing. The weighted base may define a relatively low center or mass for the system, as described further below. The power for the lighting system may be self-contained or may be provided, for example, through a power line. In some embodiments, the bottom-dwelling unit includes a power supply protector.

The examples discussed herein are examples only and are provided to assist in the explanation of the systems and methods described herein. None of the features or components shown in the drawings or discussed below should be taken as mandatory for any specific implementation of any of these systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, it should be understood that unless otherwise specified or required by context, any explicit or implicit ordering of steps performed in the execution of a method does not imply that those steps must be performed in the order presented but instead may be performed in a different order or in parallel.

Example embodiments of underwater lighting systems or retrofit underwater lighting systems described herein are designed to reduce the likelihood of entanglement with, for example, a net or sinkers used by fishermen. For example, some embodiments of underwater lighting systems or retrofit underwater lighting systems described herein are designed to have a smooth, low profile design, with no undercuts or gaps between the system and the seafloor. As used herein, seafloor may be interchangeable with the bottom or floor of another body of water. Previous systems include exposed sharp edges, protruding external bolts, and power supply lines that all can get caught in a cast net or snag a fishing line. Thus, a fisherman cannot cast a net directly over the concentration of bait centered around the light because the net would get caught. Instead, a cast net has to be thrown off to the side away from the bait fish to avoid snagging the lighting system and/or power supply. The lighting system, in some embodiments, is designed to partially embed itself in the seafloor by mechanical methods (e.g., using vibration or oscillation, such as an eccentric weight mounted on an electric motor shaft) or by passive methods, such as those driven by tide or current that allow sand and silt to accumulate at the base of the lighting system, thereby closing gaps. According to various embodiments, the lighting system has a reduced support area on the base, for example a thin lip, rib, or section of material, such as plastic or metal, that develops high contact pressure with the sea floor allowing it to embedded. For example, the lighting system includes one or more of a lip extending from the housing and/or power supply that is buried into the seafloor, non-exposed bolts (i.e., are contained within the housing and/or power supply), and a smooth dome housing. The low-profile design allows fisherman to cast a net or fishing line directly over the lighting system where bait is most concentrated, maximizing the ability to catch bait without getting tangled. The smooth design would also be safer for boats that drive over the system, limiting the possibility of catching a light or power supply. In some embodiments, the cover and the seal may be integrated in a single component and may include, for example, a transparent, flexible diaphragm that provides a water tight seal. The diaphragm could be low profile and resist damage from mechanical impacts.

Figure 2:
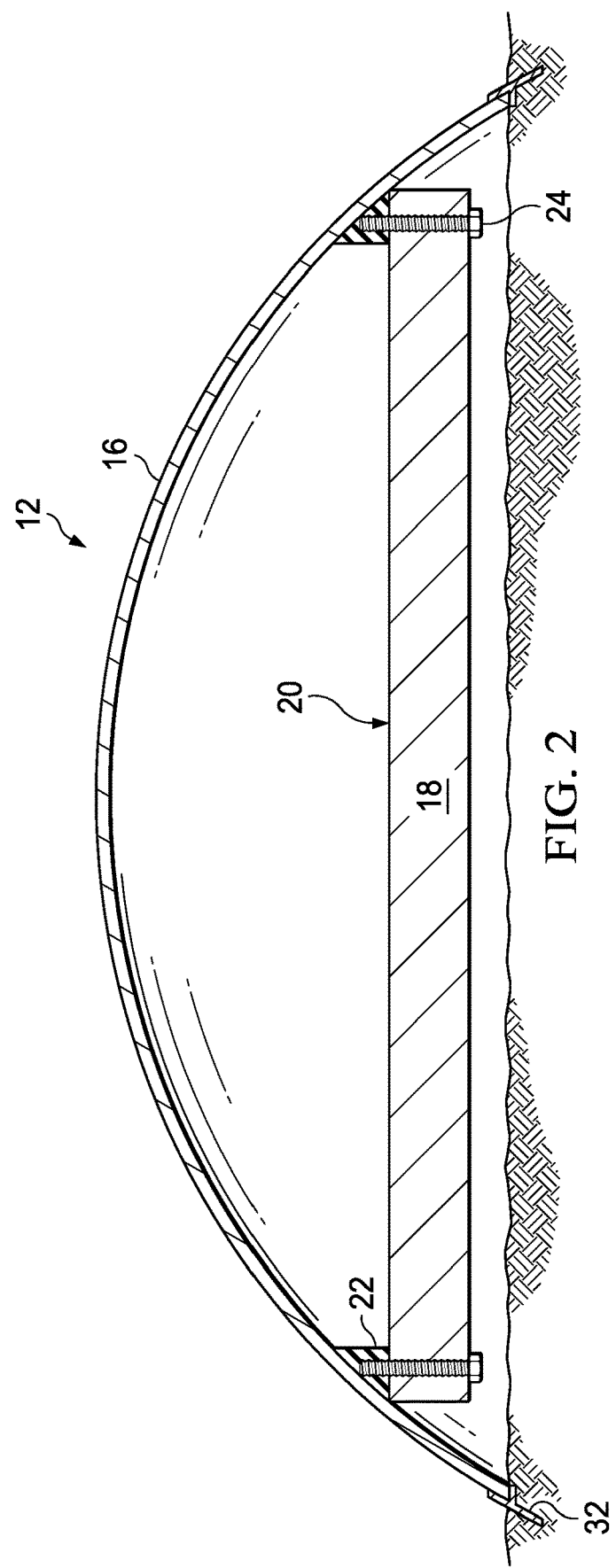
FIG. 2 is a cross-sectional view of a light housing according to an embodiment.
Figure 3:
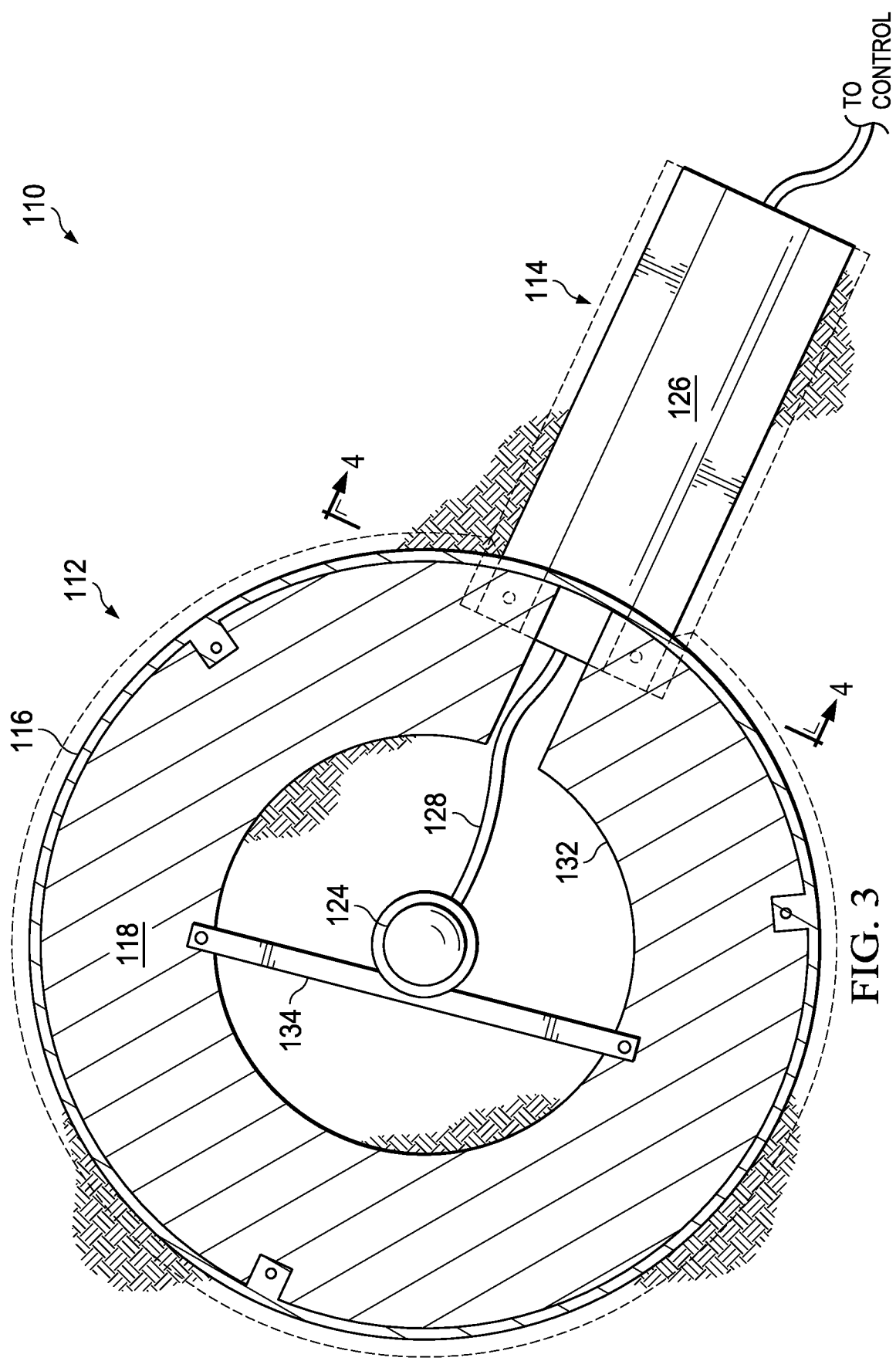
FIG. 3 is a top view of a retrofit underwater lighting system including a light housing and a power supply protector according to an embodiment.

An underwater lighting system in accordance with the present disclosure can include a light housing, a power supply protector, or a combination thereof. For example, as shown in FIGS. 1 and 2, an example embodiment of an underwater lighting system 10 includes a light housing 12 and a power supply protector 14. In an embodiment, the lighting system 10 may include more than one light housing 12 coupled to a single power supply protector 14. The light housing 12 includes a cover 16 and a weighted base 18. The shape of the cover 16 may vary, as discussed further below. For example, the cover 16 may be dome-shaped, square, trapezoidal, etc. The cover 16, or at least a portion thereof, is transparent or translucent. In an embodiment where at least one other component of the light housing 12 are transparent or translucent, the cover 16 may be opaque. Suitable materials for the cover 16 include, without limitation, tempered glass, polycarbonate, acrylic, and/or flexible materials, such as elastomers. The cover 16 can be tinted to control the wavelength of the light emitted. Although not so limited, the desired wavelength of the emitted light may be in the green spectrum. In some embodiments, the wavelength may be in a range of 520 nm to 540 nm or about 530 nm. The shape and/or weight of the base 18 may vary. For example, the weight of the base 18 may be in a range of about 10 pounds to about 20 pounds. The shape and configuration of the base 18 and/or of the overall system 10 may determine the dive angle of the system 10. Accordingly, controlling the shape of the base 18 and/or of the overall system 10 allows for control of the dive angle. For example, controlling the location of the center of gravity (e.g., to be in the lower half of the system) may allow a lighting system 10 to land right-side up on the seafloor as discussed further below. Thus, the distribution of weight can act as part of a buoyancy management system for deployment and retrieval. In an embodiment where at least one other component of the light housing 12 are transparent or translucent, the cover 16 may be opaque. Suitable materials for the base 18 include, without limitation, steel, stainless steel, cast iron, polymer, or elastomer. If desired, dead weight can be added to the material of the base via a manufacturing process, such as filler added to injection molding process. Alternatively, dead weight, such as sand, can be encased between two layers of material and hermetically sealed with adhesives, epoxy, or mechanical methods such as ultrasonic welding or frictional welding. In an embodiment, the base 18 may include a reflective surface 20. Suitable materials for the reflective surface 20 include, for example, a polyester such as Mylar®, a metal such as stainless steel, and may be textured like an orange peel reflector. The reflective surface 20 is on a surface of the base 18 facing the cover 16 to radiate light away from the base 18 to maximize the quantity of light (lumens) being directed into the surrounding water. The base 18, or at least a portion thereof, may be transparent, translucent, or opaque. Where the base 18 is transparent or translucent, the light housing 12 may provide more diffuse lighting compared to when the base 18 is opaque.

The interior of the light housing 12 is waterproof. In an embodiment, a waterproof seal 22, such as a gasket or O-ring, is coupled to the cover 16. The waterproof seal 22 may be, for example, compressed by a series of bolts arranged in a circular pattern or by a V-groove ring clamp that applies pressure to the gasket. Suitable materials for the seal 22 include, without limitation, a polymer such as, for example, polyurethane, silicone, EPDM, or neoprene. As shown in FIG. 2, waterproof seal 22 may be coupled to the base 18 and the cover 16. The base 18 may be coupled to the waterproof seal 22, for example, by mechanical fasteners such as a clamping chime, screws, or bolts 24. The seal 22 may be compressed between the cover 16 and the base 18. The light housing 12 may include a light source 26 positioned within the cover 16. The light source 26 may be coupled to the weighted base 18.

The light source 26 may be a single light or a series or array of lights. The light source 26 may be, for example, an LED light. The light source 26 may include an integrated circuit board (e.g., a PCB). The light source 26 may be automatically or manually adjustable by a user. In an embodiment, the light source 26 may be configured to have multiple pre-programmed modes. For example, a user may be able to control the light source 26 to dim or increase the brightness, change the color, or cause a flash effect or strobe effect. Pre-programmed modes may be triggered by a sensor. For example, the lighting system 10 may be configured to turn on the light source 26 when a light sensing diode detects that it is dusk. The lighting system 10 may be configured to control the temperature of the light source 26. Heat transfer from an integrated circuit board (e.g., the PCB with LEDs) to surrounding ambient environment can be engineered to maximize LED longevity. For example, the PCB can be mounted in direct contact with thermally conductive material (e.g., using conductive paste) to establish the necessary heat transfer to the ambient environment. The LED filament style of lamp combines many relatively low-power LEDs on a transparent glass substrate, coated with phosphor, and then encapsulated in silicone. The lamp bulb can be filled with inert gas, which moves heat away from the extended array of LEDs through convection to the envelope of the bulb. This design avoids the requirement for a large heat sink and may allow for a controlled temperature rise on the surface of the cover, thereby preventing biofilm from forming as discussed further below.

In some embodiments, the lighting system 10 includes more than one light housing 12. For example, the light housing 12 can be daisy chained to additional light housings 12 coupled to a single power source receiving power and user input from a single controller. In another embodiment, multiple light housings 12 could be deployed, each with a direct power supply connection to the controller (i.e., in a "home run" configuration). In both a daisy chain and home run configuration, each light housing 12 is receiving power and control input from a single source controller. The source controller can be programmed to address each light source 26 individually or all light sources 26 at the same time.

The power supply protector 14 may be a low-profile, continuously weighted housing (e.g., trapezoidal, arched, faceted). A ratio of the height to length of the power supply protector 14 may vary. For example, the ratio may be 3:12 or lower. The power supply protector 14 includes a weighted core 28 through which a power line 30 extends. The weight of the core 28 may vary. For example, the weight may be about 1 pound per foot of power line 30 that extends through the power supply protector 14. The power line 30 extends through the power supply protector 14 and to the light housing 12 to power the light source 26. The power line 30 may extend out of the water and may be coupled to a power source. The power supplied may be, for example, 120 volts AC or 12 volts DC. In an embodiment, the power line 30 may extend through a sealed aperture in the light housing 12. The aperture may be sealed with, for example, silicone. For example, the aperture may be sealed with a round silicon tubing that is compressed around the power line 30. There may be more than one aperture, such as an inlet aperture and an outlet aperture. In an embodiment where the power line 30 supplies power to more than one light housing 12, the power line 30 may enter and exit one or more light housing 12. If the power line 30 does not exit a light housing 12, the outlet aperture may be completely sealed. All connections are contained within the dome from the underside of the unit.

Referring again to FIG. 1, in one embodiment, one or both of the light housing 12 and the power supply protector 14 includes a lip 32 extending downwardly therefrom. Because the lips 32 extend downwardly from the light housing 12 and the power supply protector 14, the respective weight of the base 18 and the core 28 is supported by each of the lips 32 instead of the entire bottom of the light housing 12 and the power supply protector 14. Due to the respective weight of the base 18 and the core 28, each of the lips 32 are buried or embedded into the seafloor until the bottoms of the base 18 and the core 28 rest on the seafloor. In other words, the bottom of the base 18 and the bottom of the core 28 may sit flush with the floor. This may prevent sharp edges between the lighting system 10 and the floor where a fishing net or line may snag. Similarly, the bottom of the lighting system 10 sitting flush with the floor may prevent undercuts or other areas where a sinker or part of a net can get trapped or wedged in place. The lip 32 may extend along the entirety of the bottom of the light housing 12 and/or the power supply protector 14. For example, the lip 32 may extend along an entirety of the circumference of the cover 16. The lip 32 may be semi-flexible. Suitable materials for the lip 32 include, without limitation, a plastic, such as PVC, or a rubber, such as EPDM. In some embodiments, the lip 32 may be integral to the cover 16. For example, the lip 32 may be overmolded on the cover 16. The lip 32 may extend approximately 0.5-1.0 inch below the bottom of the base 18 and the power supply protector 14.

An underwater lighting system may be retrofit in accordance with the present disclosure. As shown in FIGS. 3-6, an example embodiment of a retrofit lighting system 110 may include a light housing 112 and optionally a power supply protector 114. The base 118 may be coupled to the cover 116. For example, the base 118 may be fastened via bolts 122 to a seal 120, which is coupled to the cover 116. The base 118 of the light housing 112 may be donut or torus-shaped defining an aperture 132. As discussed above, the shape of the base 118 and/or of the overall system 110 may determine the dive angle of the system 110. The light 124 that is being retrofitted may be positioned in the aperture of the base 118. The light 124 may itself be a light system made, for example, by another manufacturer than the retrofit lighting system 110. The light housing 112 may include a component for keeping the light 124 in position. For example, a bracket 134 may be coupled to the base 118 and the light 124. Because the light 124 is already waterproof, the light housing 112 is not required to be waterproof as well. In an embodiment, the light housing 112 may include perforations 136 (shown best in FIG. 4). When in use, the space between the cover 116 and the light 124 may be filled with water.

Figure 4:
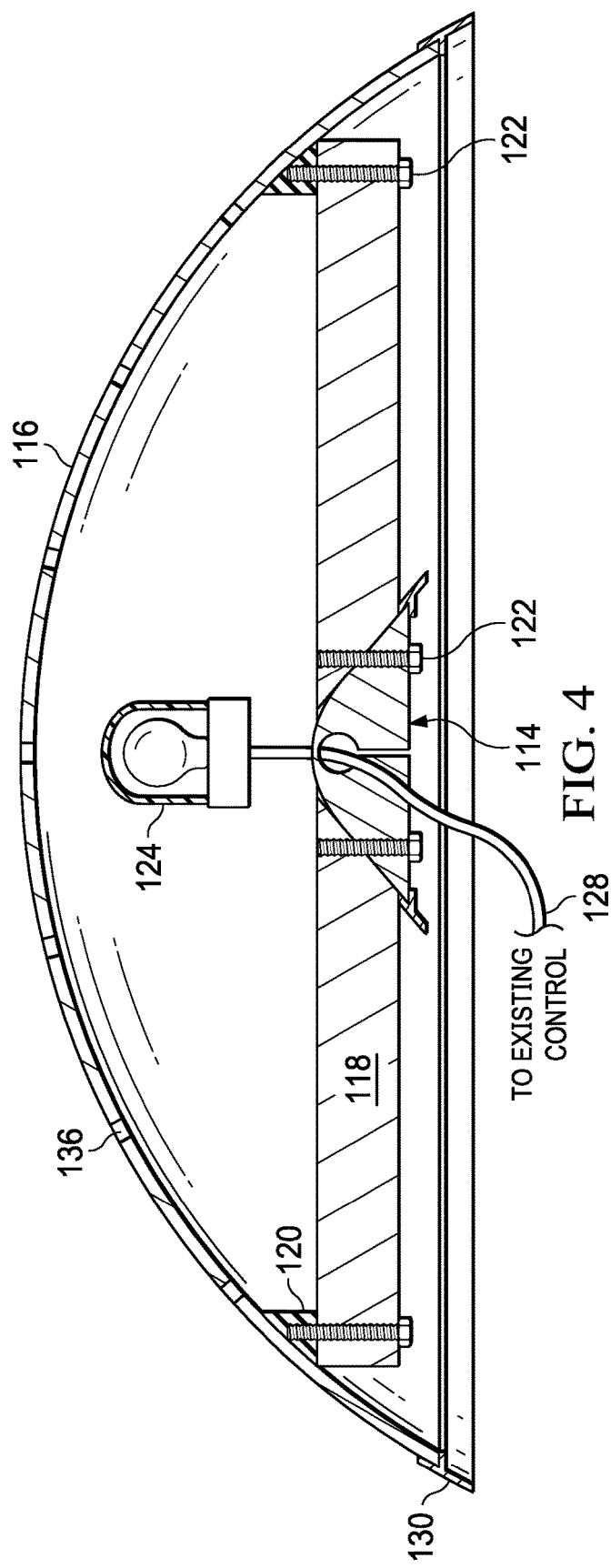
FIG. 4 is a cross-sectional view of the retrofit underwater lighting system taken at line 4-4 in FIG. 3.

With further reference to FIG. 4, the power supply protector 114 may be fastened (e.g., via bolts 122) to the light housing 112. The core 126 may include weight-filled portions 138 (e.g., lead-filled). The core 126 may also include a conduit 140 through which the power line 128 extends. In various embodiments, the conduit 140 may be a chain or spiral wound metal. A slit 142 may extend from the conduit 140 to the exterior of the core 126 to allow the power line 128 to be inserted into the conduit 140. The conduit 140 and the slit 142 may extend the length of the power supply protector 114, which may vary.

Figure 5:
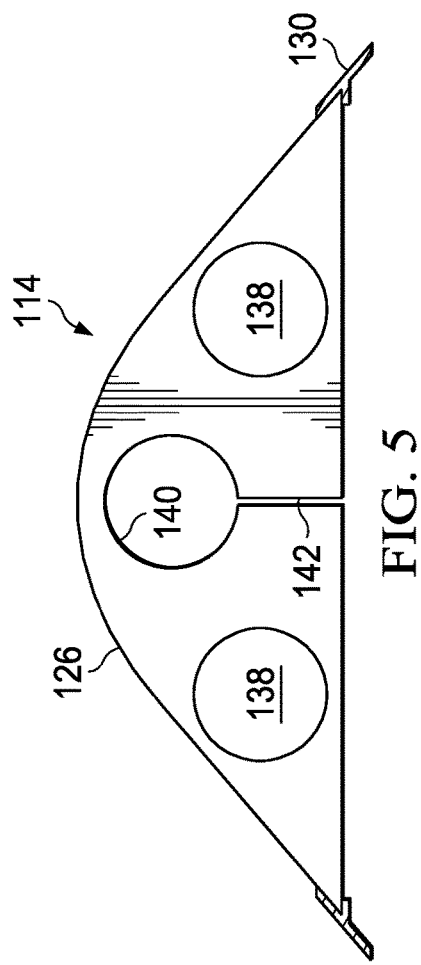
FIG. 5 is a cross-sectional view of the power supply protector of FIG. 3.
Figure 6:
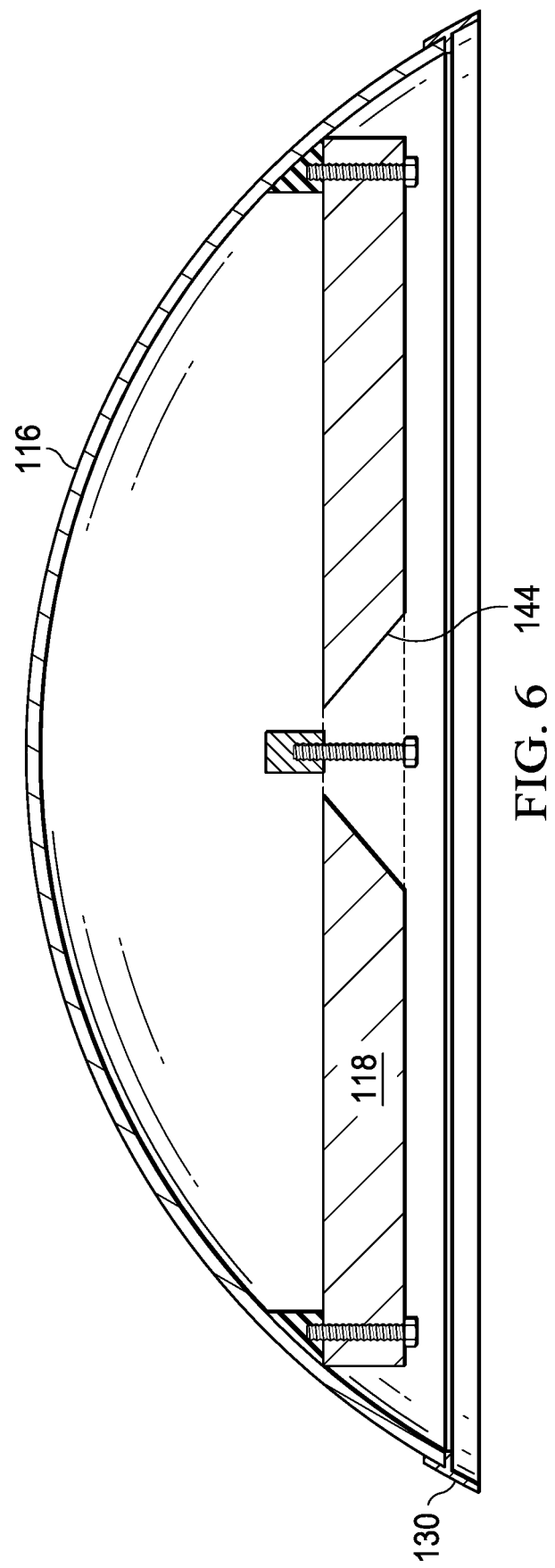
FIG. 6 is a cross-sectional view of the light housing of FIG. 3.

Referring to FIGS. 4-6, in an embodiment, a portion of the power supply protector 114 may extend into the light housing 112 and may be fastened (e.g., via bolts 122) to the light housing 112. As shown in FIGS. 5 and 6, the base 118 of the light housing may include a channel 144 corresponding to the shape of the power supply protector 114. For example, if the power supply protector 114 is trapezoidal, the channel 144 includes inwardly slanting sides. Further, the power line 128 extends from the power supply protector 114 through the channel 144 into the aperture 132 of the base 118.

In an example embodiment of a method of retrofitting a light, the light 124 may be positioned in the aperture 132 of the base 118 and attached to the bracket 134. The power line 128 extending from the light 124 may be positioned through the channel 144 of the base 118 and into conduit 140 through the slit 142 of the power supply protector 114. Thus, the power line 128 extends from the light 124, through the light housing 112, and through and out of the power supply protector 114. In this manner, the existing light 124 is configured to be a part of the retrofit lighting system 110. When positioned in the water, the lips 130 of the light housing 112 and the power supply protector 114 bury themselves in the seafloor. Thus, the smooth, low profile design of the retrofit underwater lighting system 110 reduces the likelihood of a cast net or line being caught compared to the original light 124 alone. It also allows the net or line to be cast directly over the retrofit underwater lighting system where bait is most concentrated, maximizing the ability to catch bait without getting tangled.

Figure 7:
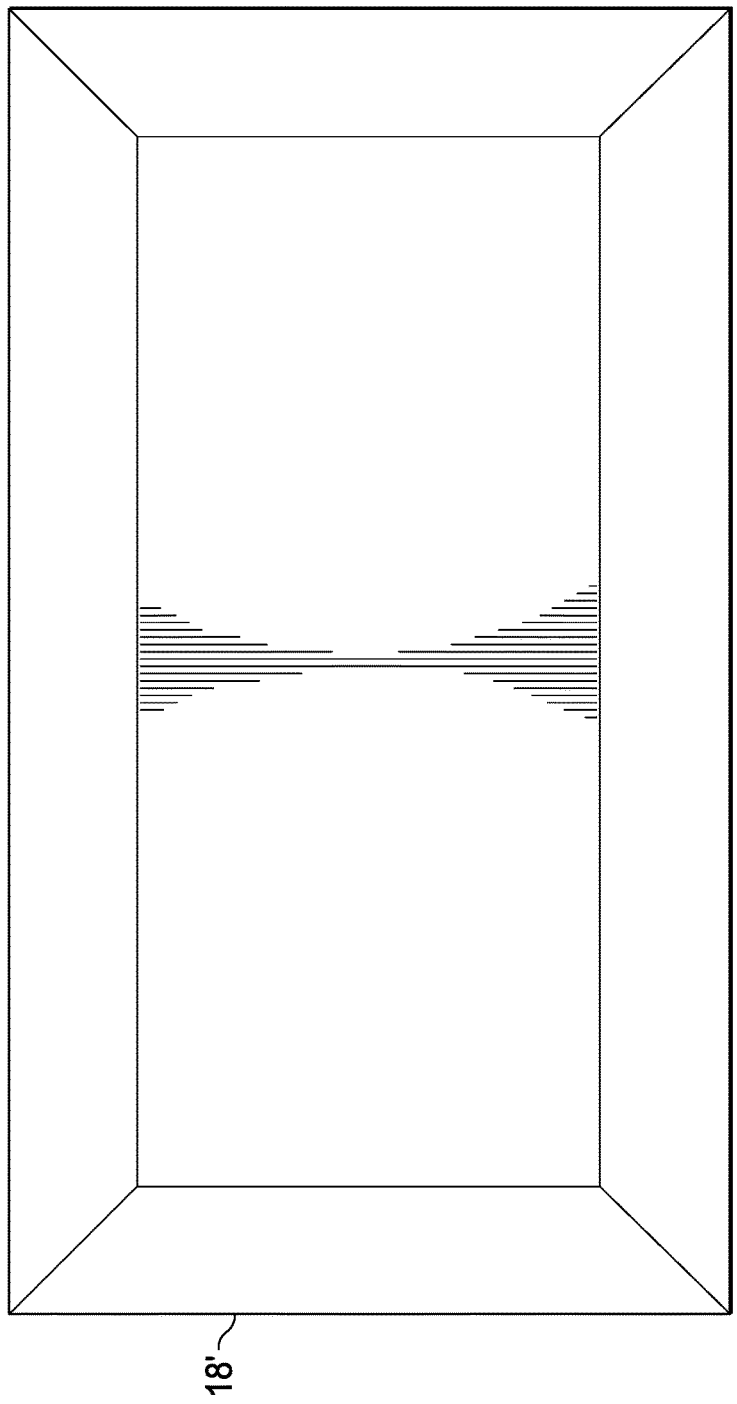
FIG. 7 is a top view of a light housing according to an embodiment.
Figure 8:
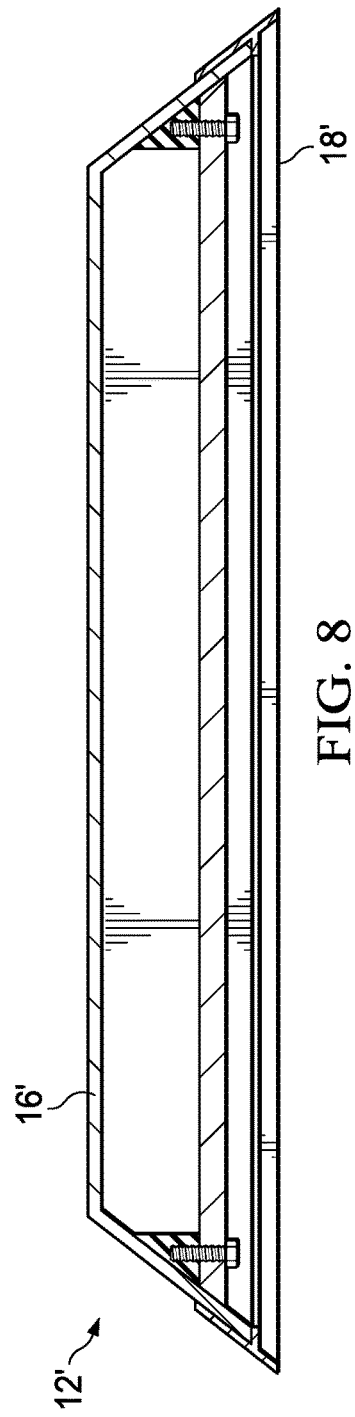
FIG. 8 is a cross-sectional view of the light housing of FIG. 7.
Figure 9:
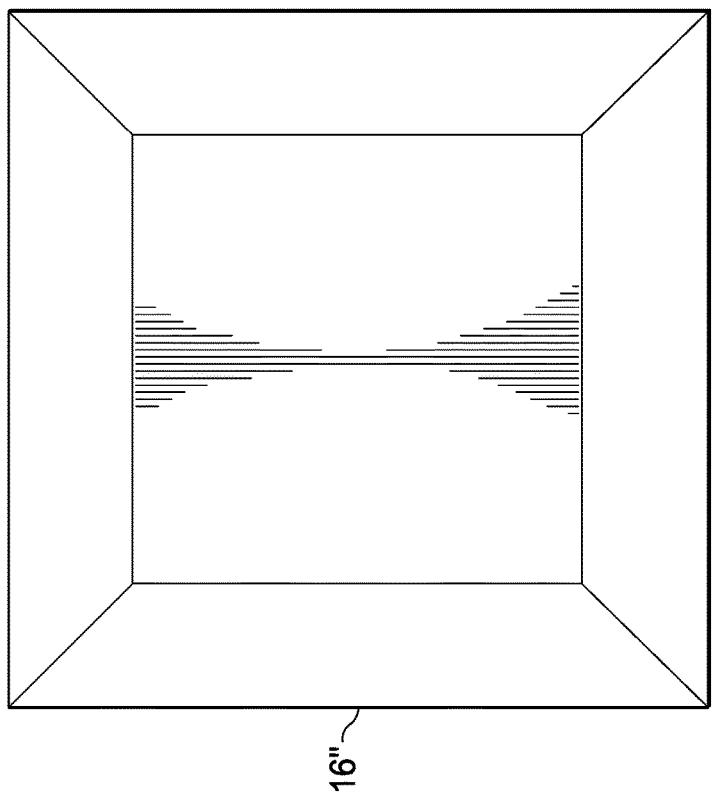
FIG. 9 is a top view of a light housing according to an embodiment.
Figure 10:
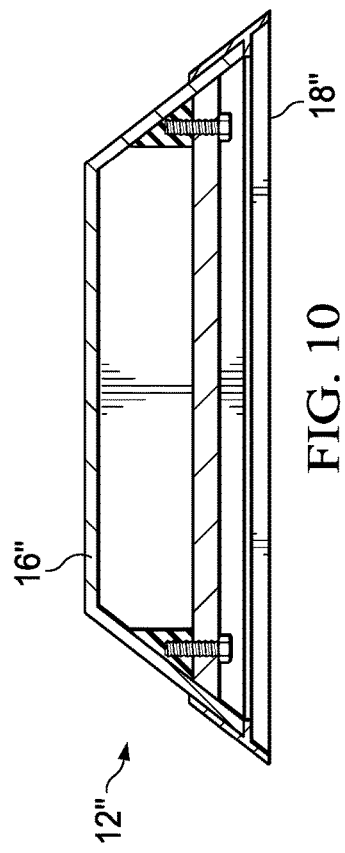
FIG. 10 is a cross-sectional view of the light housing of FIG. 9.

As discussed above, the shape of the cover 16 may vary. Further, the shape of the weighted base 18 may also vary. For example, one or more of the cover 16 and weighted base 18 may be dome-shaped, square, trapezoidal, etc. FIGS. 7 and 8 show an example of a light housing 12' having a rectangular shape. The light housing 12' includes a cover 16' having a beveled rectangular shape and a rectangular weighted base 18'. Similarly, FIGS. 9 and 10 show an example of a light housing 12" having a square shape. The light housing 12" includes a cover 16" having a beveled square shape and a square weighted base 18".

Figure 11:
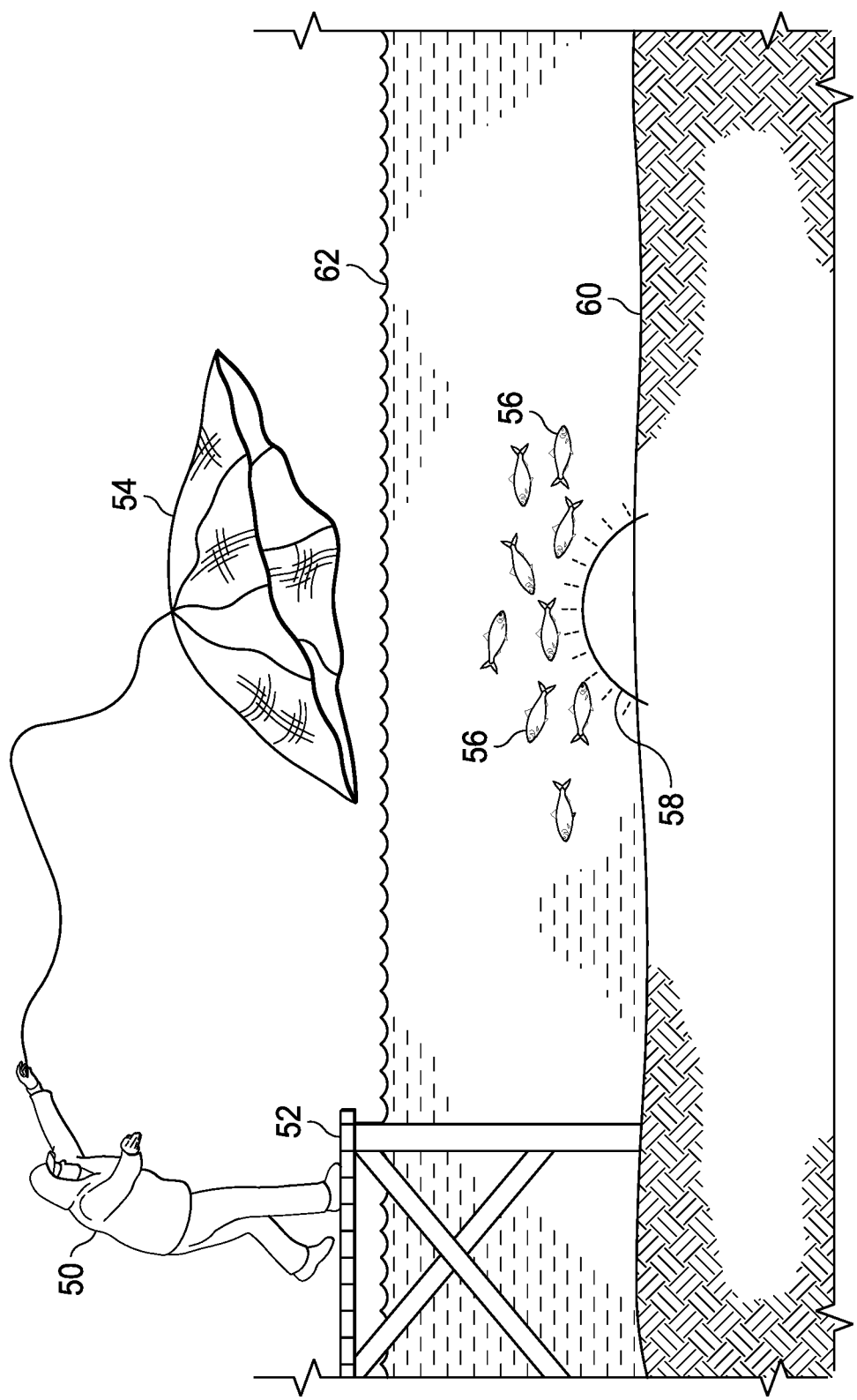
FIGS. 11-14 depict a using an underwater lighting system while casting a net to trap bait according to an embodiment.
Figure 12:
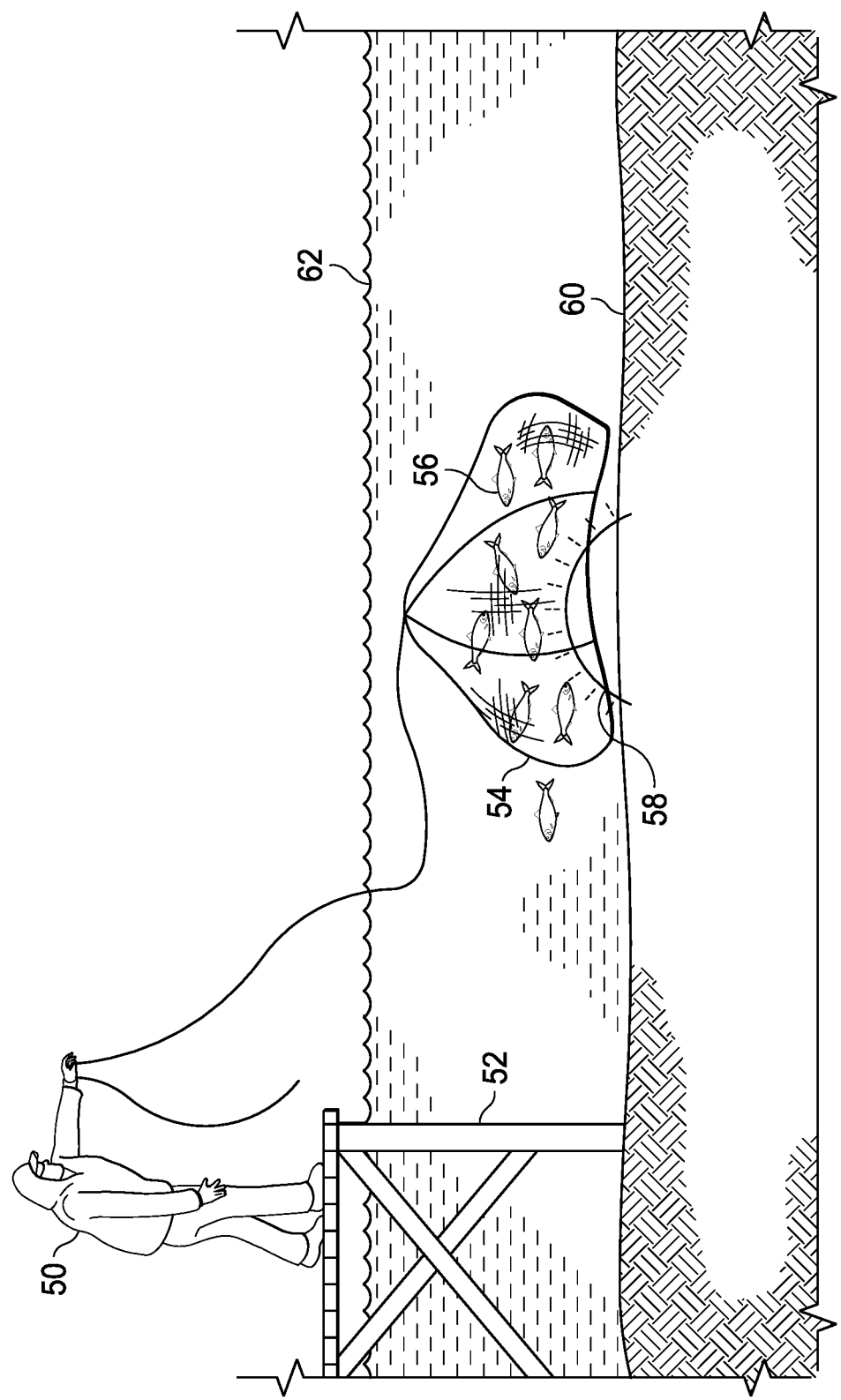
Figure 13:
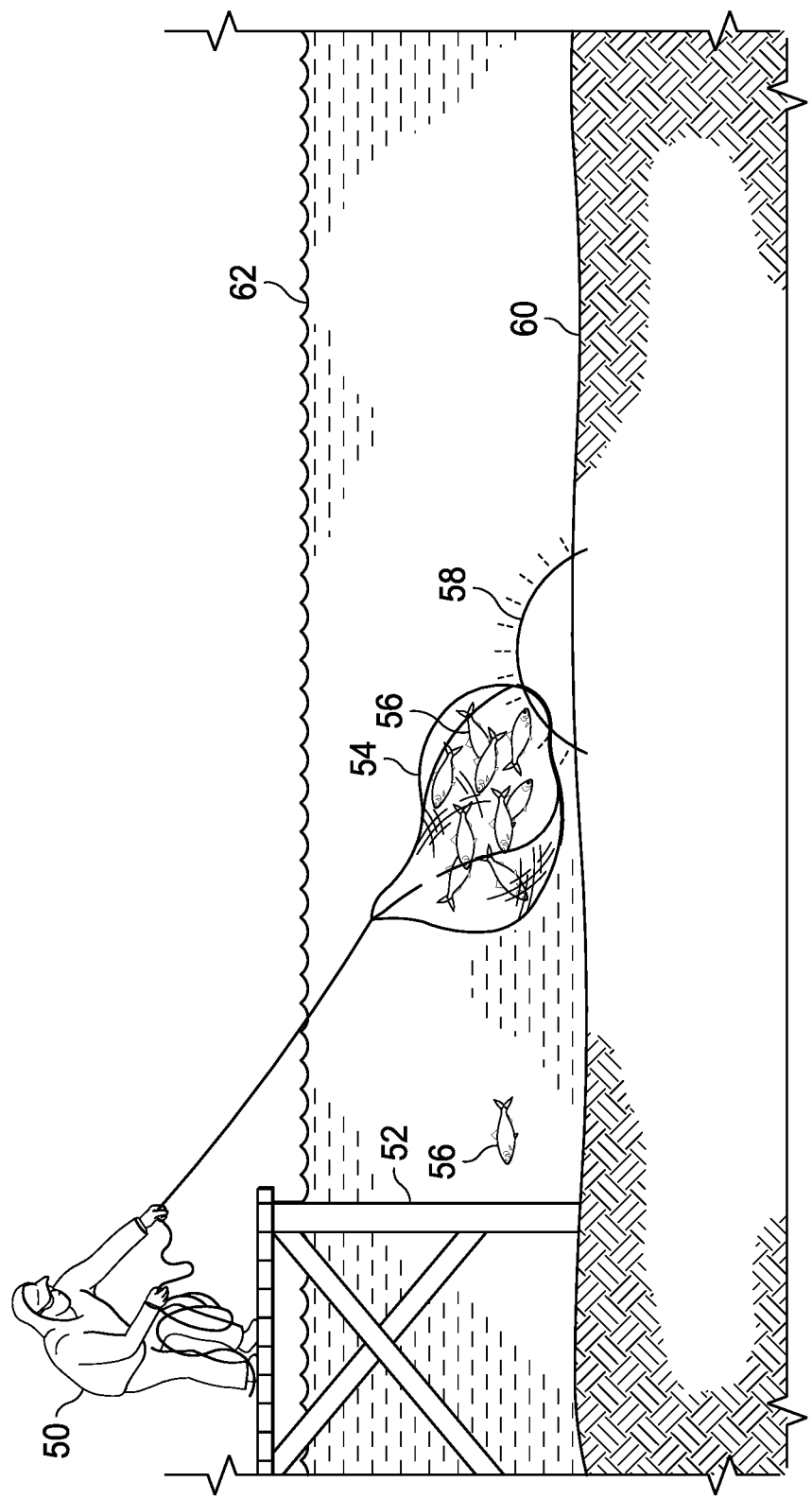
Figure 14:
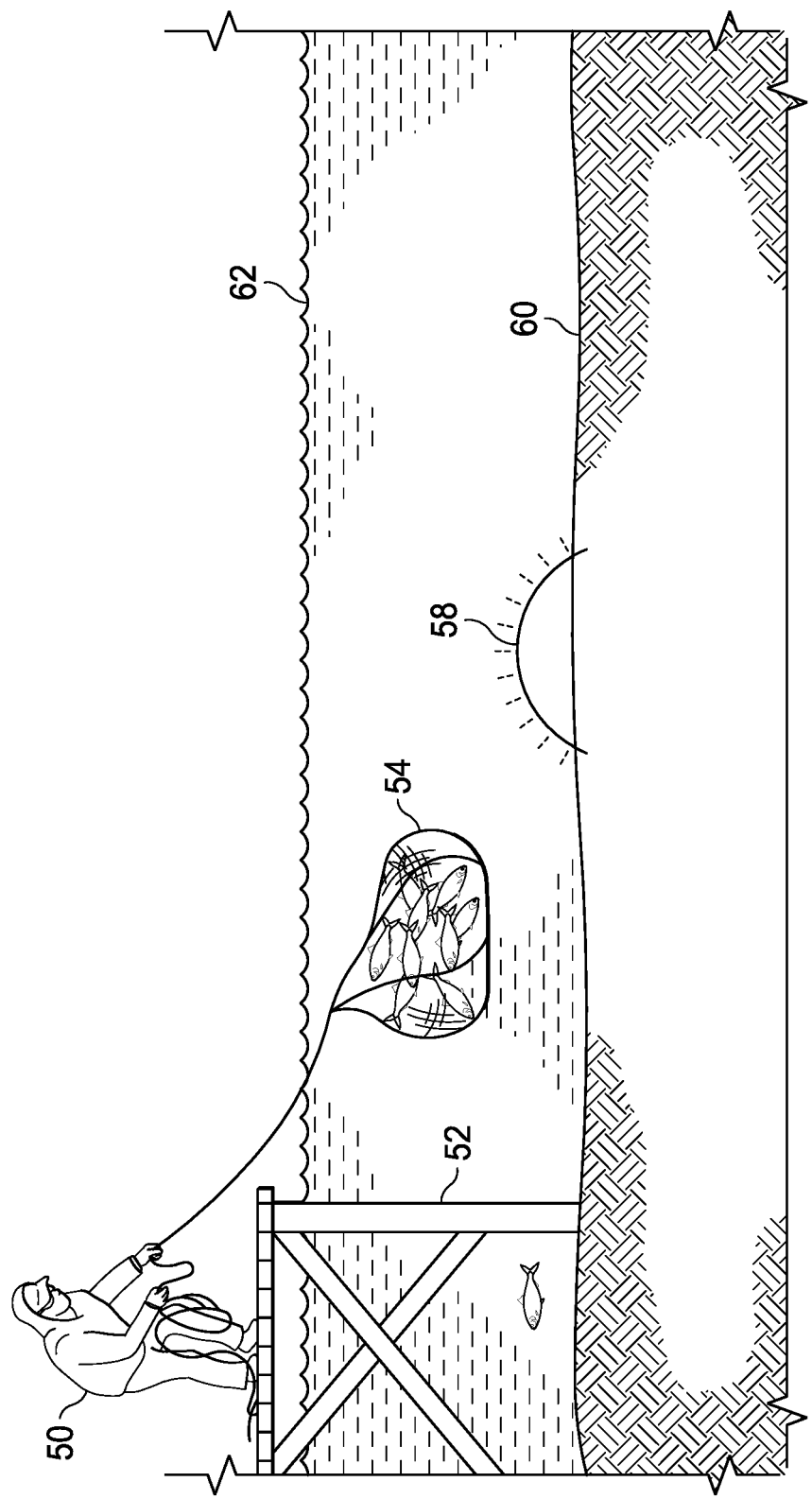

In use, an underwater lighting system may allow a fishing net or line be cast directly over the concentration of bait centered around the light without the net or line getting caught or snagged on the underwater lighting system. For example, referring to FIGS. 11-14, a fisherman 50 on a dock 52 may cast a net 54 over bait 56 attracted to light from an underwater lighting system 58 (e.g., an underwater lighting system according to any of the embodiments described herein) (FIG. 11). As the net sinks towards the floor 60 of the body of water 62, the net lands around some of the bait 56 and the underwater lighting system 58 (FIG. 12). The design of the underwater lighting system 58 allows the fisherman to close the net 54 to trap the bait 56 without the net 54 being caught or snagged (FIGS. 13 and 14).

Figure 15:
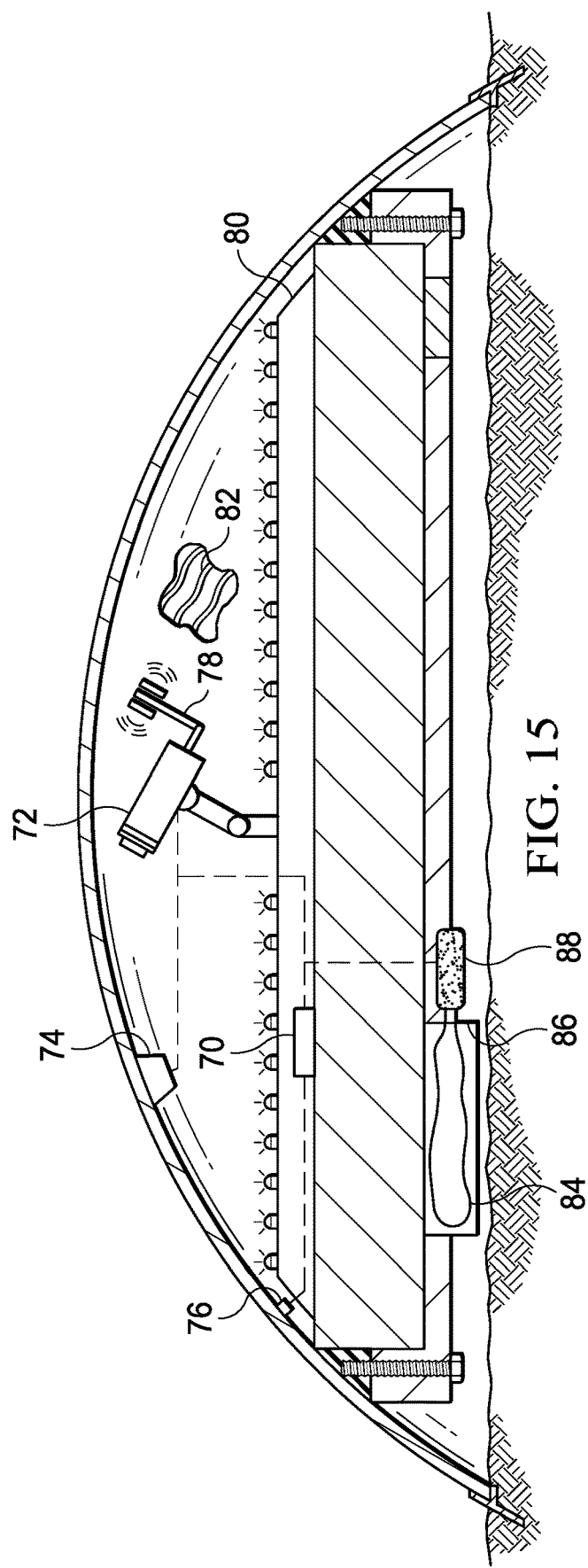
FIG. 15 is a cross-sectional view of a light housing according to an embodiment.
Figure 16:
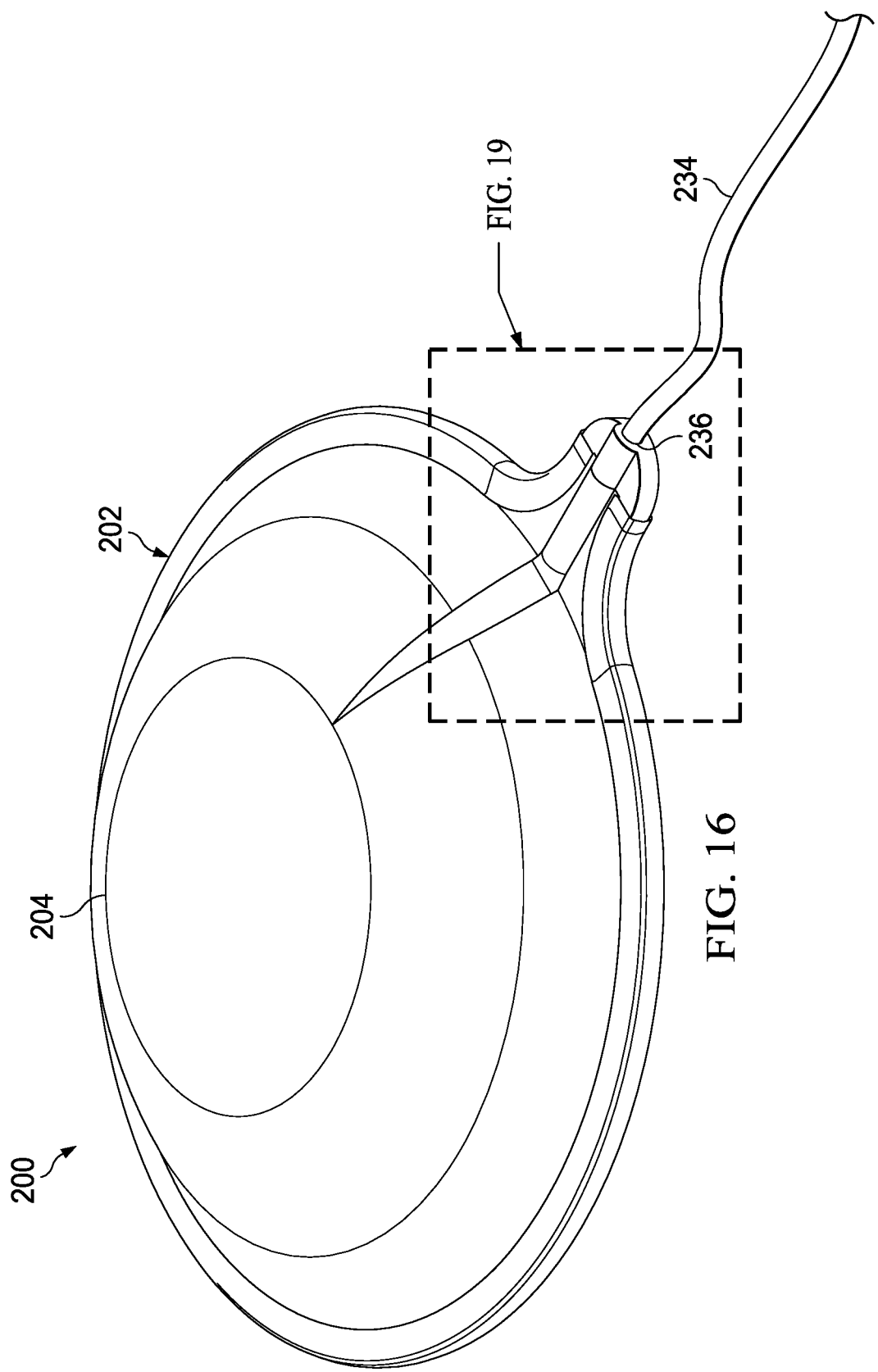
FIG. 16 is a perspective view of an underwater lighting system according to an embodiment.

The lighting system, according to various embodiments, may include one or more electrical components, each of which may or may not be coupled to a central processing unit (CPU) or controller 70 coupled with the electrical components as shown in FIG. 15. Examples of electrical components include, without limitation, a control station with a photo cell, GFCI, and a timer. The control station may be remotely positioned on, for example, a dock or boat near the light housing 12. The control station may have manual override capabilities to turn the light on and off outside of the photocell controller. Additional electrical components include, without limitation, communications components, a camera 72, a speaker 74, one or more sensors 76, etc. For example, the lighting system can communicate data via a wired or wireless (e.g., Wi-Fi, Bluetooth, etc.) connection to a remote computing device (e.g., a smart phone or other peripheral device). For example, the connection may be a Bluetooth-Cellular antenna 78. The camera 72 may be a pan-tilt-zoom camera (PTZ) camera. The lighting system may be configured to transmit pictures or a livestream of the area around the lighting system from the camera through the communications transceiver (e.g., the antenna 78). Examples of suitable sensors 76 include, without limitation, a temperature sensor, a depth sensor, etc. Data collected from the sensor(s) may also be transmitted to the remote computing device. The speaker 74 may be configured to provide acoustic signals (e.g., audible or inaudibly by humans). The controller 70 may also be operably coupled with the light source 26, such as through the circuit board 80.

In some embodiments, the lighting system may be configured to prevent or reduce the build-up of a biofilm or barnacles. For example, the lighting system may include an ultrasonic transducer that is coupled directly to the cover such that ultrasonic excitation causes cavitation on the surface of the cover (e.g., part of or instead of speaker 74). Cavitation prevents the build-up of biofilm, which attracts barnacles. In another embodiment, the lighting system may include a coating that acts to prevent the build-up of biofilm. The coating may include, for example, silver and/or copper oxide. In various embodiments, the cover interior can be heated by a direct method or by a passive method, such as with heat from the light. Examples of direct methods of heating include, without limitation, a microwave or radio frequency signal emitted by an antenna embedded in the cover or mounted to the interior of the cover, a heating element within the cover interior to heat the air in the light housing, a silver-ceramic material printed and baked onto the interior surface of the cover, a series of very fine wires embedded within the cover, or a combination thereof. As shown in FIG. 15, another method of preventing biofilm is to embed in the cover, or otherwise attach conductive wire 82 to the interior surface of the cover, where the application of current will result in power loss along the length of wire according to I squared R losses, or Joule heating the lens water interface to temperatures adequate enough to eliminate barnacle growth.

Referring to FIGS. 16-19, an example embodiment of an underwater lighting system 200 includes a light housing 202. The light housing 202 includes a cover 204 and a weighted base 206. The shape of the cover 204 may vary. For example, the cover 204 may be dome-shaped, square, trapezoidal, etc. The cover 204, or at least a portion thereof, is transparent or translucent. Suitable materials for the cover 204 include, without limitation, tempered glass, polycarbonate, or acrylic. The shape and/or weight of the base 206 may vary. For example, the weight of the base 206 may be in a range of about 10 pounds to about 20 pounds. The shape and configuration of the base 206 and/or of the overall system may determine the dive angle of the system as discussed above. Accordingly, controlling the shape of the base 206 and/or of the overall system allows for control of the dive angle. Suitable materials for the base 206 include, without limitation, a metal, a polymer, or an elastomer. In an embodiment, the base 206 may include a reflective surface, such as the reflective surface 20 discussed above, to radiate light away from the base 206 and into the surrounding water.

The base 206 may include an outer shell 208 and an inner shell 210 that define a base interior 212. The base interior 212 may be waterproof. The base interior 212 may be weighted. For example, sand 214 may be positioned in the base interior 212 to act as a dead weight to keep the lighting system 200 on the seafloor. The outer shell 208 and inner shell 210 may both include an outer flange 216, an upper surface 218, and a sidewall 220 extending therebetween. The outer and inner shells 208, 210 may be coupled or sealingly pressed together at the outer flanges 216. For example, the edges of the outer flanges 216 may be clamped together. The bottom of the light housing 202 may define a cavity 222. For example, the outer shell 208 of the base 206 may define the cavity 222, which is open to the surface under the light system (e.g., the seafloor). As discussed further below, the cavity 222 may help regulate the temperature of the light source 224 in the light housing 202. While the shape of the base 206 may vary, in the illustrated embodiment, the base interior 212 is generally shaped like a hollow truncated cone and the cavity 222 is generally bowl-shaped. The shape of the base 206 may be determined based on the desired location of the center of gravity of the lighting system 200.

In some embodiments, the cover 204 may include a wall 226 ending in an outer flange 216. The wall 226 may be a domed wall. The light housing 202 may also define a cover interior 228 between the cover 204 and the base 206 (e.g., between the cover 204 wall and the inner shell 210 of the base 206). The cover interior 228 of the light housing 202 is waterproof and may contain the light source 224. Additionally, the air pocket in the cover interior 228 may act to regulate the temperature of the light source 224 or any heating element. This temperature regulation may help in prevention the attachment of a biofilm, as discussed further below. In an embodiment, a waterproof seal 230, such as the waterproof seal 22 discussed above, is coupled to the cover 204 and the base 206. In an embodiment, the same clamp (e.g., a V-groove clamp 232) that couples the outer and inner shells 208, 210 of the base 206 may couple the base 206, waterproof seal 230, and cover 204.

Figure 19:
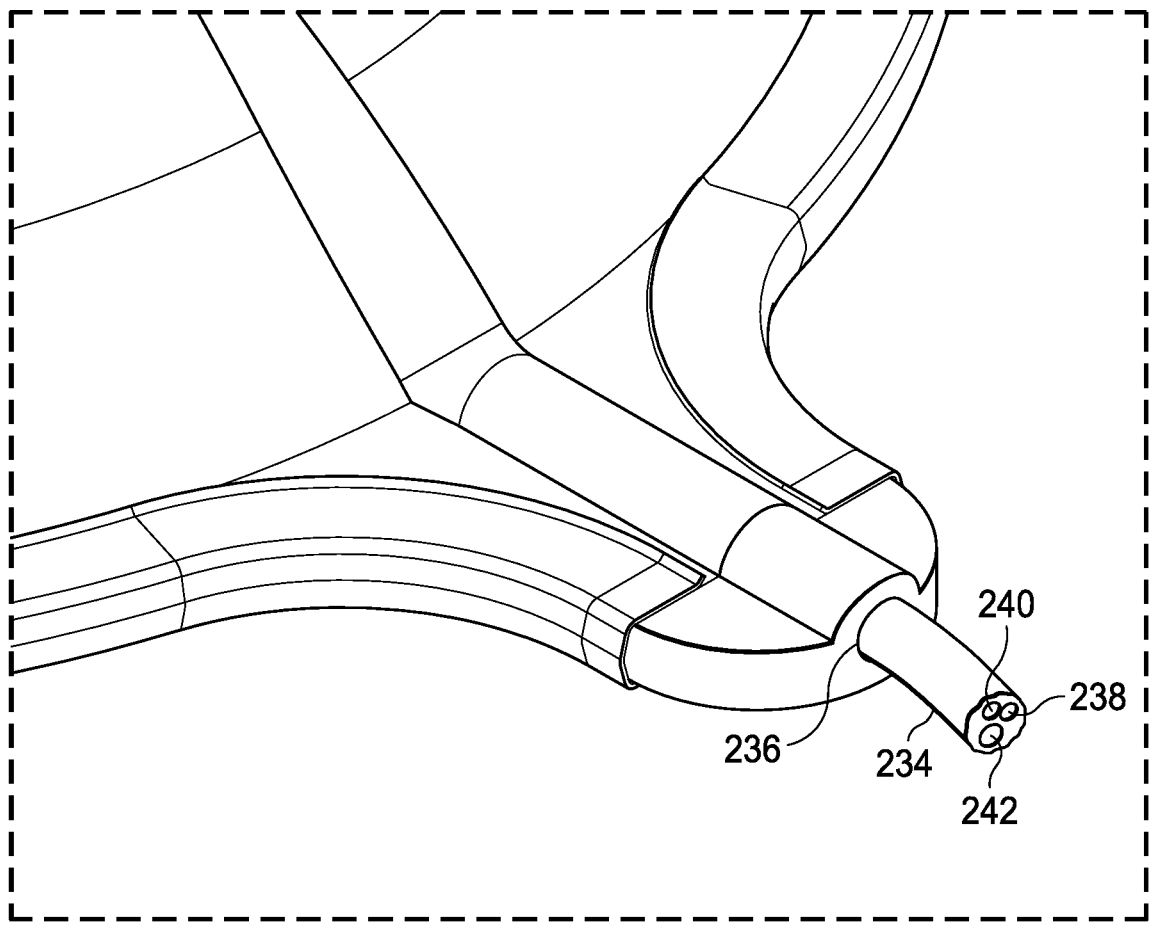
FIG. 19 is an expanded view of a portion of the underwater lighting system of FIG. 16.

Referring to FIG. 19, in an embodiment where the power supply is not self-contained, the lighting system 200 may include a power line 234 extending into the light housing 202. The light housing 202 may include an aperture 236 through which the power line 234 extends. The aperture 236 may project or extend out from the edge of the light housing 202. For example, in the illustrated embodiment, the cross-sectional area of the edge of the light housing 202 is generally circular except where the aperture 236 projects from the light housing 202. The aperture 236 can be shaped with large radii to prevent kinking or damage to the power line 234 where it enters the light housing 202. The aperture 236 can also provide strain relief, thereby isolating the soldered power connection to the light source 224 (e.g., connection to the circuit board) from damage caused by tensile forces during deployment or retrieval. The power line 234 may include a voltage conduit 238, a grounding conduit 240, and a flexible member 242 to carry tensile forces that are expected during deployment and retrieval.

Figure 20:
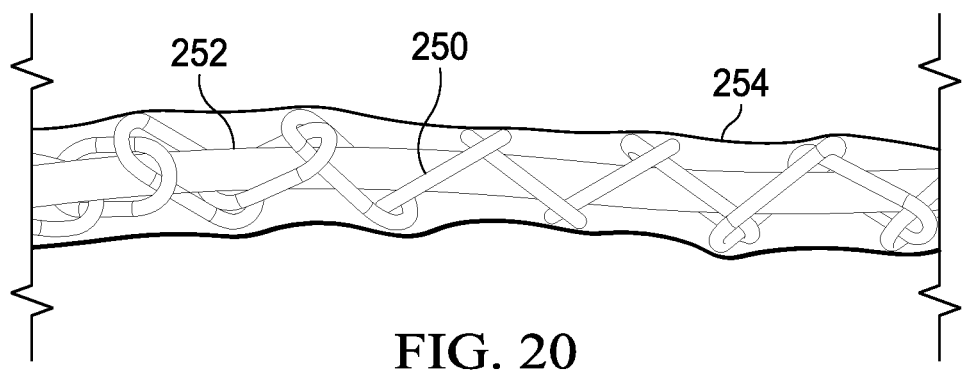
FIG. 20 is an elevation view of a power line according to an embodiment.

In some embodiments, the lighting system may include a weighted power line. In such an embodiment, the power supply protector may encase the power line as an example alternative to the housing configuration of the power supply protector 14 described above. As shown in FIG. 20, in an embodiment, the power supply protector may be a chain 250 through which the power line 252 extends. The chain 250 may provide strength and additional support to the power line 252. In an embodiment, the power supply protector may include a plastic sheath 254 surrounding the chain 250 and power line 252. As discussed further below, a reinforced power line may allow for easier deploying and retrieval of the lighting system.

Figure 21:
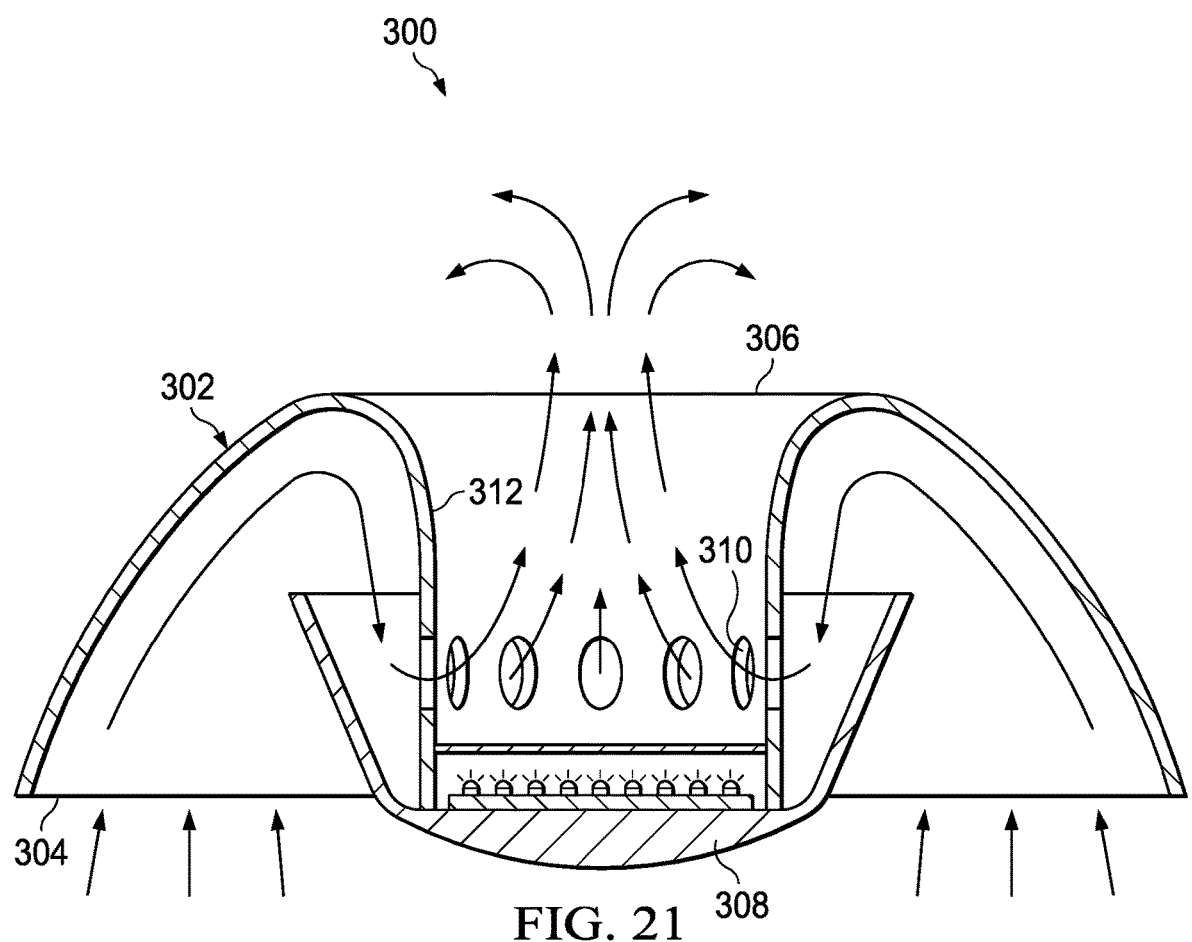
FIG. 21 is a cross-sectional view of an underwater lighting system according to an embodiment.

With reference to FIG. 21, in accordance with an embodiment, a lighting system 300 may be designed to produce a consistent and balanced drag force when it is dropped into water. The light housing 302, for example, can have an axisymmetric shape with a fluid intake portion 304 at the bottom of the light housing 302 and a fluid output portion 306 at the top of the light housing 302. As water enters the fluid intake portion 304, it can be funneled through a series of channels or apertures into the fluid output portion 306 to create a column of water to stabilize the lighting system 300 as it descends. The base 308 can be weighted (e.g., by using a heavy material or dead weight) such that the bottom of the lighting system 300, including the fluid intake portion 304, is oriented in a downward position to accept water. Drag is produced by the concentrated column of fluid flowing from the fluid output portion 306 such that the lighting system 300 remains stable during its descent.

It will be appreciated that modifying the size and shape of the fluid intake portion 304 and fluid output portion 306 can change the flow velocity, drag, or pressure as desired. In one version, the fluid intake portion 304 can have an annular configuration with a larger diameter than the annular shape of the fluid output portion 306. The flow velocity and pressure can increase based on the differential between the diameter of the fluid intake portion 304 and the fluid output portion 306. The transition from the fluid intake portion 304 to the fluid output portion 306 can, for example, be via a plurality of circumferentially located apertures or orifices 310 positioned on a wall of the fluid output portion 306. The orifices 310 may produce turbulent flow at the centrally located, vertically oriented, exhaust channel 312 to create frictional drag that may advantageously stabilize the lighting system 300 as it descends. Such a configuration can allow for the lighting system 300 to descend in a slow and controlled manner to a target location. It will be appreciated that any suitable geometry, baffles, or passive flow control features may be utilized to achieve desirable stabilization and descent characteristics. In an alternate embodiment, the lighting system 300 can include active flow control systems such as a propeller or a pump powered by an onboard battery or power system.

As described above, the lighting system may include a self-contained power supply. In some embodiments, the lighting system may include a battery. The battery may be a rechargeable battery. For example, the battery may be recharged using an inductive charger, therefore allowing for a hermetically sealed system.

In an embodiment, the cover and the seal are an integrated diaphragm of elastomeric material. By pressurizing the air surrounding the light in the cover interior, seal integrity can be visually inspected prior to use. Ultrasonic excitation could be applied to the V-groove clamp, which evenly distributes the excitation to the cover, thereby preventing accumulation of biofilm and the unwanted pests, such as barnacles, that may be attracted to a biofilm layer. The material properties of the cover can be modified to enhance the vibratory response of the system. The shape of the cover can be modified to tune the dynamic response and resonant frequency characteristics, for maximum reduction of biofilm.

To deploy an underwater lighting system, the lighting system may be lowered into the water. The user can toss the lighting system into the water, for example, using a Frisbee-throwing motion or a horseshoe-tossing motion. The user may hold the power line or another cord coupled to the light housing to control the descent of the light housing. As discussed above, the lighting system may be self-righting, so that as the lighting system hits the seafloor, the base is facing downward and the cover facing upward. Where the power line or another cord is used to lower the lighting system, in addition to the center of gravity being low in the device, the center of gravity may be shifted to the side of the lighting system opposite where the cord is coupled. As the lighting system settles on the seafloor, the edge of the base (e.g., the lip) may be partially buried due to the weight of the lighting system.

In various embodiments, the lighting system may be configured to make retrieval of the system easier. For example, the lighting system may include a selectively inflatable bladder 84 or other expandable container. The bladder 84 may be positioned in a chamber 86 that opens to the exterior of the light housing. A pressurized gas cartridge 88, such as a $CO_2$ cartridge, may be coupled to the bladder 84. When the user wants to retrieve the lighting system from the seafloor, the gas cartridge 88 may be used to inflate the bladder 84. The inflated bladder 84 will increase the buoyancy of the lighting system making retrieval easier. In an embodiment, the controller may be coupled to the gas cartridge 88 or a valve coupling the gas cartridge 88 and the bladder 84 and, accordingly, may be operably configured to control the inflation of the bladder 84. The gas cartridge 88 may be replaceable. After use, the bladder 84 may be configured to be manually deflated and repacked into the chamber 86. The inflatable bladder 84 can act as part of a buoyancy management system for deployment and retrieval.

A "remote computing device," "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. The systems and devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. An underwater lighting system comprising:
    a light housing, the light housing comprising:
        a cover having a first side and a second side opposing said first side,
        a weighted base, separate and distinct from the cover, said weighted base having a bottom surface with a bottom edge, wherein the weighted base is securable to both the first and second side of the cover, and wherein the cover and the weighted base cooperate to define a cover interior, the cover interior being waterproof; and
        a light source positioned within the cover interior, wherein the cover extends entirely over the light source;
    wherein the underwater lighting system is configured to prevent a fishing lure or cast net from snagging on the underwater lighting system.

2. The underwater lighting system of claim 1, further comprising a buoyancy management system for deployment and retrieval.

3. The underwater lighting system of claim 1, wherein a bottom edge of the light housing is operably configured to seat itself into a floor of a body of water.

4. The underwater lighting system of claim 1, wherein the cover of the light housing includes an outer lip extending downward beyond an entirety of the light source and the bottom edge of the bottom surface.

5. The underwater lighting system of claim 1, wherein the light housing is biased towards an upright position.

6. The underwater lighting system of claim 5, wherein the weighted base has a low center of gravity such that the light housing is biased towards the upright position.

7. The underwater lighting system of claim 1, wherein the light housing further comprises a waterproof seal between the cover and the weighted base.

8. The underwater lighting system of claim 1, further comprising a line coupled to the light source, the line extending from the light housing to a power source.

9. The underwater lighting system of claim 8, further comprising more than one light housing, wherein the line is coupled to each of the more than one light housing.

10. The underwater lighting system of claim 8, wherein the line includes a power line, a protective sheath, and a power line protection portion, wherein the line is configured to prevent a fishing lure or cast net from snagging on the line.

11. The underwater lighting system of claim 10, wherein the line includes at least one retrieval element configured to facilitate return of the light housing.

12. The underwater lighting system of claim 1, wherein the light housing further comprises a self-contained power supply.

13. The underwater lighting system of claim 12, wherein the self-contained power supply comprises a battery that is inductively chargeable.

14. The underwater lighting system of claim 1, wherein the light housing is configured to regulate a temperature of the light source such that unwanted growth on the cover is minimized or prevented.

15. The underwater lighting system of claim 1, wherein the light housing includes a ring clamp coupling the weighted base and the cover.

16. The underwater lighting system of claim 1, wherein the light source is an array of LED lights.

17. The underwater lighting system of claim 1, further comprising a controller operably coupled to the light source, the controller being in communication with a remote computing device.

18. The underwater lighting system of claim 1, further comprising a control element selected from the group consisting of a photo cell, a heating element, a camera, a sensor, a speaker, an antenna, and combinations thereof.

19. The underwater lighting system of claim 1, wherein the light housing comprises a biofilm prevention element selected from the group consisting of an ultrasonic transducer, a coating on the cover, a heating element, a metallic material coupled to or embedded in the cover, a metallic-ceramic composite material coupled to or embedded in the cover, and combinations thereof.

20. A method of using the underwater lighting system comprising:
- providing the underwater lighting system of claim 1
- deploying the underwater lighting system into a body of water;
- seating the weighted base on a floor of the body of water such that it will not catch on fishing nets or lures;
- activating the light source to illuminate a region of water; and
- retrieving the underwater lighting system.

\* \* \* \* \*